United States Patent [19]

Vasishth et al.

[11] Patent Number: 5,200,457
[45] Date of Patent: Apr. 6, 1993

[54] WATER REPELLANT FOR WOOD

[75] Inventors: Ramesh C. Vasishth; Darrel D. Nicholas, both of Starkville, Miss.

[73] Assignee: Forest Products Laboratory, Mississippi State University, Mississippi State, Miss.

[21] Appl. No.: 363,769

[22] Filed: Jun. 9, 1989

[51] Int. Cl.$^5$ ............................................... C08K 3/10
[52] U.S. Cl. .................................. 524/437; 524/591
[58] Field of Search ............................... 524/437, 591

[56] References Cited

U.S. PATENT DOCUMENTS

| | | | |
|---|---|---|---|
| 3,900,620 | 8/1975 | Gilman et al. | 524/437 |
| 4,192,791 | 3/1980 | Self | 523/505 |
| 4,285,997 | 8/1981 | Vasishth et al. | 524/523 |
| 4,335,109 | 6/1982 | Hill | 424/140 |
| 4,790,912 | 12/1988 | Holtzman et al. | 204/15 |

*Primary Examiner*—John C. Bleutge
*Assistant Examiner*—Mark Sweet
*Attorney, Agent, or Firm*—Bacon & Thomas

[57] ABSTRACT

A composition and method is described for making wood and other porous articles water repellant. The composition is an aqueous acidic solution or an aqueous acidic emulsion of a polymeric ingredient and an aluminum halohydrate, preferably aluminum chlorohydrate which is dissolved in the solution or emulsion. The polymers which are useful in this invention are glyoxal-urea polymers and self-crosslinking acrylic polymers. The polymers are chemically reactive with the cellulose or other components in the wood under acidic conditions upon drying. Preferably, the composition avoids the presence of toxic chromium compounds and salts which can interfere with the effectiveness of the composition. The composition offers enhanced water repellency and resists leaching due to the combination of the resin with the aluminum halohydrate.

8 Claims, No Drawings

WATER REPELLANT FOR WOOD

BACKGROUND OF THE INVENTION

Field of the Invention

The present invention relates to an improved water repellant treatment for wood and other products. More particularly, the present invention is directed toward a composition and method of use wherein the composition is impregnated into the wood to render the wood water repellant for a long period of time.

Description of Related Art

Water repellency treatment normally refers to surface treatment of wood. Such a treatment is generally carried out by dipping (1-10 minutes), by spraying or by coating the wood followed by brushing or wiping to remove the excess solution. The penetration into the wood surface need only be between 1 to 2 millimeters. This does not, however, preclude the use of vacuum/pressure treatment for special applications.

Various types of compositions have been developed for treating wood to make the wood water repellant. It is highly desirable to enhance the water repellency of wood to avoid the problems caused by the absorption of water into the wood. One such problem relates to the expansion and contraction of wood in response to the moisture content of the wood. These changes in the moisture content of wood occur when dry wood is exposed to liquid water or humid conditions. The water causes the wood to swell and this swelling results in dimensional changes which are greater in the tangential and radial direction than longitudinal direction. Such unequal dimensional changes cause internal stress which eventually leads to checking and cracking.

Wood is often subjected to repeated cycles of wetting and drying, thus aggravating the damaging effects caused by the exposure to water. The stresses generated by these repeated cycles of wetting and drying are severe and may occur at various times such as during storage in lumber yards, during construction of wooden structures, or when wood is used for outdoor uses such as decking, siding, fencing, and the like. There is a long felt need in the lumber and construction industry to reduce the damage to wood caused by exposure to water and/or moisture.

It is known to reduce the above-mentioned damage to wood by treating the wood with a water repellant solution to slow down the rate of water uptake and moisture change within the wood. Various types of solutions have been prepared which, when applied to the wood, impart water repellency. However, these solutions are not very effective because of the cumbersome and costly techniques used to assure that the wood is impregnated with the active water repellant ingredient or because the active ingredient does not remain in the wood for a long period of time, thus necessitating costly repeated applications of the water repellant solution to the wood.

Many of the water repellant formulations which are currently available are characterized by the lack of durability of the treatments under actual use. This deficiency has been noted by R. M. Rowell and W. B. Banks in a publication entitled "Water Repellency and Dimensional Stability of Wood", published in a USDA Forest Service Technical Report F.P.L.-50 (1985).

As a result of this lack of durability, most currently available water repellant treatments give only temporary water repellency to wood or products made from wood. For example, wax or wax emulsions have been used for achieving temporary water repellency. Other chemicals, such as aluminum chlorohydrate have also been reported to impart water repellency in wood. However, wood which has been treated with aluminum chlorohydrate as the water repellant agent lacks durability and must often be retreated with aluminum chlorohydrate to maintain water repellency. Several manufacturers of these types of water repellant solutions, such as the well known "Thompsons Water Seal" recommend that treatment be repeated every 3-6 months.

One such water repellant composition containing aluminum chlorohydrate is disclosed in U.S. Pat. No. 4,218,249 (Hill). This patent discloses a solution containing chromium salts along with aluminum chlorohydrate. Chromium salts impart an objectionable green color to the wood and are toxic. Therefore, such a composition is obviously unsuitable for environmentally safe applications.

U.S. Pat. No. 4,335,109, also to Hill, describes the formulations which need not contain chromium salts. The formulations described in U.S. Pat. No. 4,335,109 contain aluminum chlorohydrate and certain mono, bi, or tri-valent metal salts such as mono, bi, or tri-valent metal salts of an organic acid. This formulation also suffers from the disadvantage of requiring frequent applications to maintain adequate levels of water repellency.

U.S. Pat. No. 4,247,329 (Mills) also discloses a solution for treating wood to make it water repellant. The solution described in this patent similarly uses toxic hexavalent chromium compounds and is likewise unsuitable for safe environmental use.

It is also known to impregnate wood with resins to make the wood water repellant. According to some methods, a resin such as an alkyd or acrylic resin, is dissolved in water so that the resin can be easily impregnated into the wood. Methods of this type disclosed in U.S. Pat. Nos. 4,285,997 and 4,276,329 (Vasishth et al.). In order to obtain an aqueous composition for impregnating wood with a suitable water repelling resin, it is necessary to utilize a co-solvent such as butyl carbitol or butyl cellosolve to help solubilize the alkyd resins. The use of these co-solvents is accompanied by several disadvantages which makes their use in wood treating compositions undesirable. For example, these co-solvents dissolve some of the dark chemicals which are naturally present in the wood and, consequently, the use of these co-solvents brings these dark chemicals to the surface of the wood thereby detracting from its beauty. Additionally, aqueous compositions containing the organic co-solvents creates difficulties with respect to certain types of water soluble chemicals, such as wood preservatives, which are desirable to add to the formulation for permanent disposition in the wood treated with the formulation. Thus, the resins which require an organic co-solvent to help solubilize the resin are not suitable for impregnating wood with a water soluble ingredient along with the resin.

Another disadvantage of the alkyd and acrylic resins described in U.S. Pat. No. 4,276,329 and 4,285,997 is that they are not soluble in water unless ammonia or an amine is added to raise the pH of the solution to make it alkaline. However, it is not possible to impregnate wood with aluminum chlorohydrate if it is formulated in an alkaline solution because the aluminum chlorohydrate will react in such an environment and precipitate out as aluminum hydroxide. Thus, even in instances where an organic co-solvent is not necessary, such as in some of the acrylic resins described in U.S. Pat. No. 4,285,997, the presence of the alkaline pH of the solution precludes the possibility of formulating a water repelling composition for wood which contains a water repelling resin in combination with aluminum chlorohydrate.

Aluminum chlorohydrate has been formulated with thermoplastic acrylic emulsions for the purpose of reducing staining and discoloration of painted wood surfaces which occurs when coloring matter and tannins naturally present in the wood bleed into a subsequently applied top-coat layer. This type of formulation is described in U.S. Pat. No. 3,900,620. It has been found that the formulations prepared for this purpose utilize a wetting agent and thereby increase the wettability of the wood rather than impart water repellency. Consequently, such formulations containing aluminum chlorohydrate and a thermoplastic polymer are not suitable for imparting water repellency to wood.

It is also known to treat wood with resins for a variety of reasons. For example, it is known to add various additives to wood, such as wood preservatives, by incorporating the additive into a thermosetting resin solution. However, processes of this type require air drying the polymer at elevated temperatures of 200° F. to 300° F. which require costly equipment and energy consumption.

Thermosetting resins used for this purpose include the thermosetting resins formed by reacting urea, melamine, or phenol with formaldehyde. U.S. Pat. No 2,350,135 (Stamm) discloses a process for impregnating a thin veneer with resins of this type. The process requires that the wood veneer be plasticized by heating to 200° F. to 300° F. and then be impregnated with a solution containing a phenol-formaldehyde resin forming mix. The impregnation requires compressing the wood between rollers in an aqueous solution containing the resin forming mix. After impregnation a high temperature heat curing step is required in order to cure the resin and make it water insoluble.

During the curing step, resins of the type used by Stamm first go through a plastic stage, often termed a B stage. At this point the resins are somewhat flexible. Advantage was taken of this by Stamm in treating pieces of wood and curing the resin to the B stage so that the treated veneer can be formed into various shapes under heat and pressure. Obviously, the method of impregnation and the use of a thermosetting resin which requires a costly heat curing step makes the use of this type of system uneconomical or impractical in actual use.

U.S. Pat. No. 2,313,953 (Roughborough) also discloses the use of a thermosetting resin to impregnate wood. The resins used in this patent include urea-melamine or phenol resins formed by a catalyzed reaction with formaldehyde. It is known that the catalyzed resins are not very stable even at room temperature. To overcome this, Roughborough requires a buffering agent. The buffering agent generates acid upon heating which accelerates curing. Since a thermosetting resin is used, the impregnated wood must be heated to 300° F. to cure the wood.

Both U.S. Pat. Nos. 2,313,953 and 2,350,135 require complete impregnation, are limited to the use of thin veneers and, most importantly, require the use of high temperatures to obtain a resin cure. The major use of such impregnated veneer is in the manufacture of molded articles. The use of high curing temperatures requires costly specialized equipment and is thus unsuitable for practical purposes.

U.S. Pat. No. 2,591,768 (Austin) discloses a solventless method of impregnating wood which requires immersing the wood into a container of monomeric or partially polymerized resin to impregnate the wood with the polymerizable material. A complicated procedure is required to force the resin into the wood so that all the voids in the wood become filled. Such a procedure requires costly equipment and adds substantially to the density of the wood Additionally, a curing step of 200° F. to 225° F. is required. Consequently, this process is limited to treating wood for specialty applications only. Examples of such applications include wood which is machined into billiard sticks and other types of articles.

In view of the above-discussed prior art, it is apparent that a long felt need exists in the art for imparting water repellency to wood which does not require high temperature curing of thermosetting resins or costly methods for impregnating the resin into the wood and which can be easily applied by simple application techniques such as dipping or spraying; and cured at room temperature upon air drying and which combines a resin with aluminum chlorohydrate in a single composition to result in enhanced water repellency over a longer period of time and which avoids the use of toxic and leachable chromium compounds which are usually associated with the use of aluminum chlorohydrate.

SUMMARY OF THE INVENTION

It is an object of the present invention to provide an aqueous composition for rendering wood water repellant which can be easily applied to wood by simple application techniques such as dipping, spraying, or brushing the composition onto the wood.

It is another object of this invention to provide an aqueous water repellant composition for treating wood which does not require a high temperature curing step.

It is another object of this invention to provide an aqueous water repellent composition for treating wood which contains a waterborne resin with aluminum chlorohydrate and which, when applied to wood, provides enhanced long lasting water repellent properties to the wood.

It is another object of this invention to provide an improved water repellent composition for wood which contains aluminum chlorohydrate which is not leachable from the wood.

It is another object of this invention to provide a long lasting water repellant composition for treating wood which contains aluminum chlorohydrate without any toxic chromium compounds contained therein.

These and other objects of the invention are provided by an improved water repellant treatment for wood which uses an aluminum halohydrate, especially aluminum chlorohydrate, in combination with a waterborne polymer. The polymer may be an aqueous solution or an aqueous emulsion provided the emulsion or solution is compatible with aluminum halohydrate.

The resins used in the present invention are those which either become water insoluble upon air drying or by reacting with cellulose or with other components of wood. Suitable resins are urea adducts of glyoxal and some self-crosslinking acrylic polymers such as those containing diglycidylacrylates as co-monomers. The self-crosslinking acrylic polymers must contain one or more reactive groups. Monomers by themselves that contain reactive groups such as diglycidylacrylates can also be used. The polymers must be compatible with aluminum halohydrate, particularly aluminum chlorohydrate and, therefore, the resins are limited to those resins which are stable under acid conditions, i.e. they remain as a stable solution or emulsion in an acidic pH. Preferred resins are acid stable acrylic and urea-glyoxal resins.

The self-crosslinking acrylic polymers have residual functional groups. Upon drying, these functional groups form chemical bonds between molecules without the addition of any other ingredients even under ambient conditions. They are therefore called self-crosslinking.

The glyoxal-urea adducts are not only capable of reacting with themselves, but upon loss of water by evaporation, they react with the hydroxyl groups in cellulose to form cross links. The reaction occurs more readily under acidic conditions and is accelerated by the application of heat.

The resins are used in the form of an aqueous solution or emulsion. For this reason, resins made by conventional aqueous emulsion polymerization techniques are particularly suitable. Aqueous emulsions of acrylic polymers which are suitable for this invention are available from Rohm and Haas as "RHOPLEX HA-8" "RHOPLEX HA-12" and "RHOPLEX HA-16". Each of these is a conventional aqueous emulsion of a non-ionic, self-crosslinking acrylic polymer. Suitable urea-glyoxal resins include dimethylol dihydroxyethylene urea which acts as a crosslinking agent for cellulose. These resins react with cellulose under acidic conditions upon drying. A suitable urea-glyoxal resin is available as a solution from American Cynamide as "AEROTEX REACTANT 900".

The resin containing solution or emulsion used in this invention must be acidic so that the aluminum halohydrate will remain in solution and not precipitate out of the solution as aluminum hydroxide. The preferred pH is greater than two (2) and less than seven (7). The above-mentioned "RHOPLEX HA-8", "RHOPLEX HA-12", and "RHOPLEX HA-16" and "AEROTEX REACTANT 900" formulations are all acidic and, thus, they need no acidification.

The aluminum halohydrate ingredient is preferably aluminum chlorohydrate. A suitable aluminum chlorohydrate is available as a 50% aqueous solution and is sold as "WICKENOL 303" by Wicken Products, Inc. Huguenot, N.Y.

The solution or emulsion of the present invention contains water, dissolved aluminum halohydrate, and the acrylic or urea-glyoxal resin and sufficient acid to achieve an acidic pH. To make the solution or emulsion, the above ingredients are mixed together. Preferably, aluminum halohydrate is used in the form of an aqueous solution. If necessary, the resin solution or emulsion is first acidified to an acid pH before the addition of the aluminum halohydrate.

Wood may be impregnated with the solution or emulsion by a simple dipping or spraying operation or any other means of contacting the wood with the solution or emulsion. Afterwards, the wood is aged to air dry the impregnated wood. The amount of water repellency is enhanced after an aging period of about two (2) months. Air drying of the resin results in curing wherein the resin becomes water insoluble.

Treatment with the compositions of the present invention offers substantial benefits not found in the prior art water repellant compositions. For example, chromium compounds or salts such as those found in the composition of U.S. Pat. No. 4,218,249 are preferably not present in the compositions of the present invention. These chromium compounds and salts mentioned above are avoided in the present invention since they destroy the emulsion. Chromium salts are also avoided because they are not compatible with urea-glyoxal polymers.

The compositions of the present invention retards the leaching of the aluminum halohydrate and thus they offer a significant improvement over the compositions described in U.S. Pat. Nos. 4,218,249 and 4,335,109. This desirable result is achievable by combining the aluminum halohydrate with the specific resins disclosed herein. Such a combination has not been possible in the prior art resin compositions because the resin emulsions previously used for treating wood such as those described in U.S. Pat. Nos 4,285,997 and 4,276,329, are not compatible with an aluminum halohydrate such as aluminum chlorohydrate.

In addition, the compositions used in the present invention do not require high temperature curing which is required when thermosetting resins are used.

In addition to solving the leaching problem which is characteristic of the prior art compositions containing aluminum chlorohydrate; the compounds of this invention also provide enhanced water repellency not found in other water repellant compositions containing aluminum chlorohydrate. For example, U.S. Pat. Nos. 4,218,249 and 4,335,109 also contain aluminum halohydrate but the compositions of these patents do not provide the degree of water repellency obtainable with the compositions of the present invention. In particular, it has been observed that the water repellency obtained when the resins used in the present invention are combined with the aluminum chlorohydrate compositions of U.S. Pat. Nos. 4,218,249 and 4,335,109, an inferior water repellant product is produced. It is believed that the inferior results occur due to the large amount of chromium salts found in the composition of U.S. Pat. No. 4,218,249 and the mono, bi, and trivalent metal salts used in the composition of U.S. Pat. No. 4,335,109. Thus, it is believed that avoidance of large amounts of these compounds in the present invention provides benefits in addition to the ones already mentioned.

DETAILED DESCRIPTION OF THE INVENTION AND PREFERRED EMBODIMENTS

In a preferred embodiment of this invention, a self-crosslinking acrylic aqueous acidic emulsion containing 6% by weight polymer solids is mixed with an aqueous solution containing 50% by weight of aluminum chlorohydrate. Each ingredient is added in an amount to form an aqueous acidic formulation containing 6% by weight polymer solids and 29% by weight aluminum chlorohydrate with the balance being water. No other ingredients are necessary although a catalytic amount of a catalyst may be added if desired.

A suitable aluminum chlorohydrate is the "WICKENOL 303" or "WICKLOR 904" sold by Wicken Products, Inc. of Huguenot, N.Y. Suitable self-crosslinking acrylic emulsions include the "RHOPLEX HA-8", "RHOPLEX HA-12", and "RHOPLEX HA- 16" emulsions which are sold by Rohm and Haas of Philadelphia, Pa. The above-mentioned "RHOPLEX" emulsions are sold as acidic emulsions containing about 45% polymer solids. The pH of the above-mentioned "RHOPLEX" emulsions is 3.1 and, it is therefore not necessary to add any acid to the formulation when these commercially available acrylic emulsions are used.

The above described preferred formulation is used to treat wood in order to render the wood water repellant. The treatment comprises contacting the wood with the formulation by any suitable method such as by dipping, spraying, or brushing the formulation onto the wood. It is not necessary that the entire volume of the wood become impregnated with the solution since adequate water repellency properties can be obtained with only a slight penetration of about 1-2 millimeters into the wood. After impregnation the wood is air dried at ambient conditions and preferably aged for about two (2) months or more to maximize the water repellency. Curing of the polymer may be enhanced by mild heating to 50° C. to 55° C. However, such heating is not necessary since the resins used are curable at ambient conditions.

Preferably, the chromium salts disclosed in U.S. Pat. Nos. 4,218,249 and 4,247,329 and the mono, di, and trivalent salts disclosed in U.S. Pat. No. 4.335,109 should be avoided since they interfere with the emulsion. However, the avoidance of the above-mentioned compounds does not preclude the use of certain compounds such as biocidal compounds which may be added in small amounts without interfering with the emulsion. Conventional plasticizers may also be avoided in this invention since a plasticizer is not necessary in the formulation to achieve adequate impregnation and film forming capability.

Since the present invention is directed toward achieving water repellency, the presence of wetting agents should also be avoided since they tend to defeat the function of the water repellant composition when incorporated therein.

The aluminum halohydrates which are useful in this invention are described in U.S. Pat. Nos. 4,218,249; 4,247,329; and 4,335,109, the specifications of which are incorporated herein by reference. In a preferred embodiment, aluminum chlorohydrate is used in the form of an aqueous solution, preferably a solution containing 50% by weight of aluminum chlorohydrate. The "WICKENOL 303" solution is an aqueous 50% aluminum chlorohydrate which has an atomic ratio of 2 aluminum atoms to 1 chlorine atom. The aluminum chlorohydrate used in "WICKENOL 303" has the chemical formula: $Al_2(OH)_5Cl.X H_2O$. The aluminum chlorohydrate used in "WICKENOL 303" is further characterized in attached TABLE I.

Although the amount of polymer solid in the composition of the preferred embodiment is 6%, the amount of polymer solids may vary significantly and still retain its ability to impregnate the wood along with the aluminum halohydrate and result in acceptable water repellency. Thus, the amount of polymer solids in the composition may be as high as about 20% but should not be below about 3%.

The amount of aluminum chlorohydrate in the preferred embodiment is 29% based upon the amount of aluminum chlorohydrate solids which are dissolved in the composition. The amount of aluminum chlorohydrate may be as low as about 1%. The amount of aluminum halohydrate useful for achieving water repellency is well established in the prior art such as in U.S. Pat. Nos. 4,218,249; 4,247,329; and 4,335,109 and these amounts are suitable in the present invention.

The water repellant treating formulation of the present invention is not confined to treating lumber but is also effective in treating composite boards such as plywood, particle board, wafer board, hard board, and other building material such as shakes, shingles, stucco, concrete, and concrete aggregates as well as paper and textiles. Consequently it should be considered a general purpose water repellant treating formulation. However, it is most effectively used on materials such as wood and paper products which contain cellulose since the polymers are capable of reacting with the cellulose to produce a more effective anti-leaching property.

A substantial quantity of wood is currently treated with a solution containing copper-chromium-arsenic salts. Such a mixture is commonly called "CCA". Wood which has been previously treated with these compounds may also be treated with the composition of this invention to make the wood water repellant.

The following non-limiting examples are given to further illustrate the invention:

| | Formulation | Weight Percent |
|---|---|---|
| EXAMPLE 1: | | |
| | Wickenol 303 (50%) | 29.0 |
| | Calcium Oxide | 4.6 |
| | Acetic Acid | 7.6 |
| EXAMPLE 2: | | |
| | Wickenol 303 (50%) | 29.0 |
| | Zinc Acetate | 12.2 |
| | Water | 58.8 |
| EXAMPLE 3: | | |
| | Wickenol 303 (50%) | 29.0 |
| | Calcium Oxide | 4.6 |
| | Acetic Acid | 7.6 |
| | Urea-Glyoxal Polymer (6%) | 6.0 |
| | Water | 52.8 |
| EXAMPLE 4: | | |
| | Wickenol 303 (50%) | 29.0 |
| | Zinc Acetate | 12.2 |
| | Urea-Glyoxal Polymer (6%) | 6.0 |
| | Water | 52.8 |
| EXAMPLE 5: | | |
| | Wickenol 303 (50%) | 29.0 |
| | Self-crosslinking acrylic emulsion (6%) | 6.0 |
| | Water | 65.0 |

Each of the five examples contain aluminum chlorohydrate. In each example the aluminum chlorohydrate was added as a 50% aqueous aluminum chlorohydrate solution in an amount to provide 29% by weight of aluminum chlorohydrate in the composition. Examples 3-5 contain a polymer. The polymer of Examples 3-5 was added in an amount to provide a polymer solids content of 6% by weight of the composition. For example, the composition of Example 5 used an aqueous emulsion of a self-crosslinking acrylic polymer in an amount to provide 6% polymer solids in the final composition.

Examples 1 and 2 do not contain any polymer and thus they serve to demonstrate the effectiveness of the prior art compositions which are formulated without the chromium compounds required by U.S. Pat. No. 4,218,249. Examples 1 and 2 also contain a divalent metal salt which is calcium acetate in Example 1 and zinc acetate in Example 2. The calcium acetate of Example 1 was provided by adding equimolar quantities of calcium oxide and acidic acid which react in the formation of calcium acetate in situ.

Examples 3 and 4 were made by adding glyoxal urea resin to the compositions of Examples 1 and 2, respectively. Thus, Examples 3 and 4 serve to demonstrate the effectiveness of the polymer/aluminum chlorohydrate combination when formulated with the metal salts required by U.S. Pat. No. 4,335,109.

Example 5 contains only water, "WICKENOL 303" (a 50% aqueous solution of aluminum chlorohydrate) and an acidic self-crosslinking acrylic emulsion. Thus, Example 5 illustrates an embodiment of the present invention which does not contain a chromium compound or any of the metal salts required by U.S. Pat. No. 4,335,109.

To compare the efficacy of the treating solutions of the examples 36" long 1"×4" southern yellow pine panels were used. Each panel was cut into two 18" long panels. One 18" panel was treated and the matched 18" piece was left untreated to be used as a control for comparison. All of the panels were numbered and end sealed with a wax emulsion and air dried for 24 hours. The treatment with the test solutions comprised dipping the panel into the solution or emulsion for five (5) minutes. The panels were weighed before and after treatment in order to obtain solution retention.

The treated panels were aged for two (2) months. After aging both the treated panels and their matched controls were weighed. They were then placed on long edges in a vat with a weight on top and the vat was filled with water. The panels were removed after 60 minutes, wiped and weighed. The results were calculated as weight gain based upon the original dry weight of the aged panels. The ratios of the amount of water absorbed by the treated panels and their corresponding controls were calculated. These values are shown in TABLE II. The ratio shown in attached TABLE II represent the amount of water absorbed for the control divided by the amount of water absorbed by the corresponding treated panel.

The results shown in TABLE II indicate that water repellant solutions which consist of aluminum chlorohydrate and an organic acid salt, without the addition of chromium salts, impart water repellency as indicated by the C/T ratios of 2.89 and 3.34 (Examples 1 and 2). The results of Examples 3 and 4 shows that incorporating a polymer into the composition of Examples 1 and 2 results in ratios which are somewhat improved. Example 5, which contains a polymer but which lacks the salts of Examples 1-4 has a C/T ratio of 11.21 and thereby demonstrates a dramatic improvement over the water repellency achieved in the other examples.

The efficacy of the five water repellant treatments was further compared by determining the time taken by a drop of water to soak into the treated wood and the corresponding controls, a method described in U.S. Pat. No. 4,335,109. The results are given in the attached TABLE III. The results shown in TABLE III indicate that this test method is not very precise since this test, unlike the soak test, does not distinguish between the water repellency achieved as a result of each of the treatments in Examples 1-5. The results do however indicate that each treatment resulted in enhanced water repellency in comparison to the control samples. However, due to the imprecision in this test, it is apparent that the water soak test is a better method for detecting the differences in water repellency for each treatment.

While the present invention has been described in term of certain preferred embodiments and exemplified with respect thereto, one skilled in the art will readily appreciate that variations, modifications, changes, omissions, and substitutions may be made without departing from the spirit thereof. It is intended, therefore, that the present application be limited solely by the scope of the following claims.

TABLE I

ALUMINUM CHLOROHYDRATE SPECIFICATIONS

| TEST | LIMITS | ANALYSIS |
|---|---|---|
| Form @ 25° C. | Clear, water white liquid | Clear, water white liquid |
| % Aluminum as Al | 12.2–12.7% | 12.5% |
| % Chloride | 7.9%–8.4% | 8.2% |
| Al:Cl Atomic Ratio | 1.9:1 to 2.1:1 | 1.99:1 |
| Iron as Fe | 50 ppm Max. | 31 ppm |
| Lead as Pb | 10 ppm Max. | Below 1 ppm |
| Arsenic as As | 1 ppm Max. | Below 0.1 ppm |
| Sulfate | 0.025% Max. | Below 0.0025% |
| Specific Gravity @ 15° C. | 1.335–1.345 | 1.3428 |
| pH, 15% Solids, aqueous 30 g/100 of 50% soln. | 4.2–4.4 | 4.33 |

TABLE II

Comparison of water pickup after a 60 minute soak of southern yellow pine treated with different water repellant solutions and untreated matched controls after 2 months.

| Example No. | Solution | C/T Ratios[1] 2 Months |
|---|---|---|
| 1 | Aluminum Chlorohydrate & Calcium Acetate | 2.89 |
| 2 | Aluminum Chlorohydrate & Zinc Acetate | 3.34 |
| 3 | Solution of Example 1 & Glyoxal Urea Resin | 4.61 |
| 4 | Solution of Example 2 & Glyoxal Urea Resin | 3.94 |
| 5 | Self Cross-linking Acrylic & Aluminum Chlorohydrate | 11.21 |

[1]Weight of water absorbed by controls divided by weight of water absorbed by treated panels.

TABLE III

Time required for a water drop to soak into treated and untreated southern pine.

| Mixture No. | Treated | Control (Untreated) |
|---|---|---|
| 1 | >120 | 2.5 |
| 2 | >120 | 10.0 |
| 3 | >120 | 2.4 |
| 4 | >120 | 1.4 |
| 5 | >120 | 1.6 |

We claim:

1. A composition for making wood water repellant; said composition consisting essentially an acidic aqueous solution or an acidic aqueous emulsion of a glyoxal-urea adduct and an aluminum halohydrate dissolved in said solution or emulsion; said glyoxal-urea adduct being capable of reacting with cellulose contained in said wood under acidic conditions upon drying.

2. A composition for making wood water repellant; said composition consisting essentially of an acidic aqueous solution or an acidic aqueous emulsion of di-methylol dihydroxyethylene urea and an aluminum halohydrate dissolved in said solution or emulsion.

3. The composition of claim 1, wherein said composition is in the form of an acid stable solution.

4. The composition of claim 3, wherein the aluminum halohydrate is aluminum chlorohydrate.

5. The composition of claim 4, wherein the aluminum chlorohydrate has the formula: $Al_2(OH)_5 Cl\text{—}X\ H_2O$.

6. The composition of claim 5, wherein the amount of aluminum chlorohydrate is greater than 1% by weight and the amount of polymer solids is 3%-20% by weight.

7. The composition of claim 6, which contains 29% by weight of aluminum chlorohydrate and 6% by weight polymer solids.

8. The composition of claim 7, wherein the polymeric ingredient is dimethylol dihydroxyethylene urea.

* * * * *